Aug. 23, 1927.  
E. T. HEINSON  
1,640,191  
WATERLESS COOKER  
Filed Sept. 7, 1926

INVENTOR.  
E. T. Heinson.  
BY  
ATTORNEYS.

Patented Aug. 23, 1927.

1,640,191

UNITED STATES PATENT OFFICE.

ERNEST T. HEINSON, OF MOUNTAIN IRON, MINNESOTA, ASSIGNOR OF TEN PER CENT TO THOMAS H. STRIZICH, OF THE VILLAGE OF HIBBING, MINNESOTA.

WATERLESS COOKER.

Application filed September 7, 1926. Serial No. 133,865.

This invention relates to waterless cookers.

The object of the invention is the construction of a simple and efficient cooker, which includes an outer receptacle provided at its top with an offset portion, and which offset portion is provided with upwardly extending ribs on its bottom or "floor," whereby an inner receptacle, supported upon the outer receptacle may be permitted to seat snugly upon the outer receptacle or space slightly therefrom to permit steam or liquid to pass between the two receptacles.

This invention is an improvement upon the invention disclosed in my co-pending application, Ser. No. 133,864, filed Sept. 7th, 1926, "waterless cooker."

With the foregoing and other objects in view, my invention comprises certain novel constructions, combinations and arrangements of parts as will be hereinafter fully described, illustrated in the accompanying drawings, and more particularly pointed out in the appended claim.

In the drawings:

Figure 4 is a fragmentary, sectional view of the outer and inner receptacles in a seated or closed position, while

Figure 7 is a fragmentary, sectional view of another embodiment of the outer receptacle, showing a struck-up integral form or type of a rib, while

Figure 6:
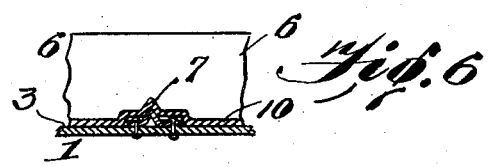
Figure 6 is a sectional view taken on line 6—6, Figure 5, and looking in the direction of the arrows.

Referring to the drawings by numerals, 1 designates the outer or water container receptacle, which is provided at its top with an offset portion 2, and arranged around the bottom 3, of offset portion 2 are a plurality of detachable, upwardly extending elongated rib plates 4. These rib plates may be fastened to the bottom of the offset portion by any suitable means, such as rivets 5. The inner receptacle 6 is provided in its outstanding shoulder with struck-up sockets 7 for receiving the upwardly extending ribs of the rib plates 4, when it is desired to have the inner and outer receptacles in a closed position, as shown in Figure 6 for preventing steam or water, under normal conditions, from passing therebetween.

Figure 1:
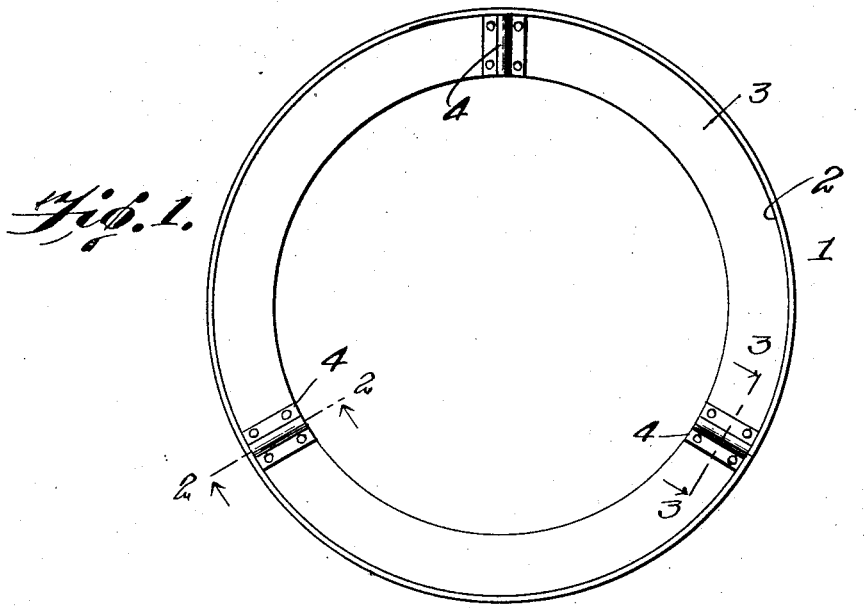
Figure 1 is a top plan view of the outer or water container receptacle, of my improved cooker.
Figure 2:
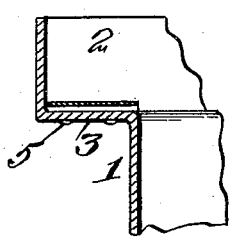
Figure 2 is a sectional view taken on line 2—2, Figure 1, and looking in the direction of the arrows.
Figure 3:
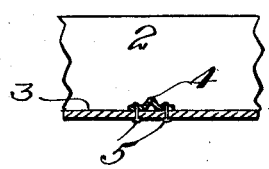
Figure 3 is a sectional view taken on line 3—3, Figure 1, and looking in the direction of the arrows.
Figure 7:
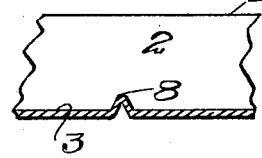
Figure 4:
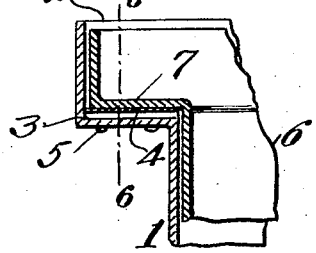
Figure 5:
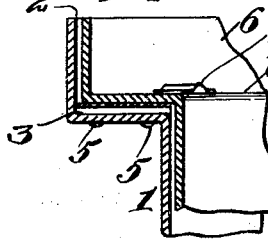
Figure 5 is a similar view, except that the inner receptacle is in an unseated position.
Figure 8:
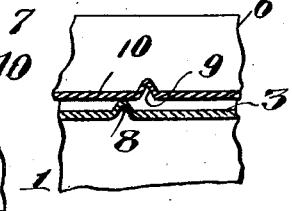
Figure 8 is a longitudinal, fragmentary sectional view of an inner and an outer receptacle in a raised or "open" position, with the inner receptacle resting on the top of the struck-up rib, allowing steam or water to pass between the receptacles.

In the embodiment shown in Figures 7 and 8, the elongated rib 8 is an integral part of the bottom 3 of offset portion 2 by it being struck-up from the bottom. This rib 8 is adapted to fit or register with socket 9 formed in the shouldered portion 10 of the inner receptacle 6. It will be obvious that as many of these ribs 8 and sockets 9 may be provided on the cooker as desired, their function being to allow the two receptacles to fit snug together, for confining the heat and steam, or when the operator desires the steam in the outer receptacle 1 to escape, by slightly raising the inner receptacle 6 and giving it a slight turn, the shouldered portion 10 thereof will be seated on the top of ribs 8, as clearly shown in Figure 8, to allow steam or water to pass therebetween.

While I have described the preferred embodiments of my invention and illustrated the same in the accompanying drawings, certain minor changes or alterations may appear to one skilled in the art to which this invention relates, during the extensive manufacture of the same, and, I, therefore, reserve the right to make such alterations or changes as shall fairly fall within the scope of the appended claim.

What I claim is:

In a cooker, the combination of an outer receptacle provided with an offset portion, said offset portion having a flat horizontal floor, elongated ribs formed on said floor and extending the entire width of said floor, an inner receptacle in said outer receptacle and provided with an outstanding shoulder, said shoulder provided with a flat horizontal bottom, said bottom provided with horizontal elongated sockets, and said sockets being of the same length as the width of said shoulder and receiving said elongated ribs thereby forming a tight joint the entire width of said shoulder when said shoulder rests snug on the floor of said off set portion.

In testimony whereof I hereunto affix my signature.

ERNEST T. HEINSON.